Patented Apr. 6, 1943

2,315,922

UNITED STATES PATENT OFFICE 2,315,922

PREPARATION OF N-MONOMETHYL-P-AMINOPHENOL

Frederic R. Bean, Rochester, N. Y., assignor to Eastman Kodak Company, Rochester, N. Y., a corporation of New Jersey No Drawing. Application December 6, 1939, Serial No. 307,887

7 Claims. (Cl. 260—574)

This invention relates to the preparation of N-monomethyl-p-aminophenol by decomposition of p-hydroxyphenylglycine.

It is known that p-hydroxyphenylglycine can be decomposed by heat. A portion of this decomposition reaction is a decarboxylation according to the following chemical equation:

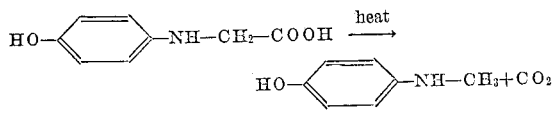

However, the aforesaid decarboxylation is not the only form of decomposition that takes place when p-hydroxyphenylglycine is heated. Still other kinds of decomposition obtain, with the result that a tarry reaction mass is obtained from which it is very difficult to isolate pure N-monomethyl-p-aminophenol.

In an effort to obtain a process whereby p-hydroxyphenylglycine could be decomposed to N-monomethyl-p-aminophenol without encountering tarry reaction mixtures, it has been proposed to decompose p-hydroxyphenylglycine in protective reaction media containing essentially organic compounds, having a boiling point above about 140° C. and which do not decompose appreciably at their boiling points.

This proposal has been attended with some success, i. e. by employing protective reaction media, the formation of N-monomethyl-p-aminophenol appears to be favored at the expense of the more complex decomposition products, so that the formation of tarry reaction product is substantially diminished. However, it was found that the rate of decomposition of the p-hydroxyphenylglycine was very slow (in fact, frequently practically nil) in a number of protective reaction media.

Of those protective reaction media in which p-hydroxyphenylglycine can be decomposed to N-monomethyl-p-aminophenol at a practical rate, phenol, cresols (cresylic acid), thymol, carvacrol, cyclohexanol, cyclohexanone and benzaldehyde are probably the best known. On the other hand, in protective reaction media containing essentially diamyl ether or amyl acetate, for example, the rate of decomposition of p-hydroxyphenyl-glycine to N-monomethyl-p-aminophenol is practically nil at practical working temperatures.

Even with those known protective media in which the decomposition of p-hydroxyphenyl-glycine to N-monomethyl-p-aminophenol was found to proceed at a substantial rate, the formation of side-reaction products is not entirely avoided. Particularly where the protective reaction medium contains essentially an organic compound of high chemical reactivity like an aldehyde or a ketone, the formation of side-reaction products (frequently colored or tarry) is undesirably high. At least in the case of aldehydes, some of these side reaction products appear to be due to interaction with the N-monomethyl-p-aminophenol, as it forms in the reaction mixture.

I have now found that p-hydroxyphenylglycine can be rapidly decomposed to N-monomethyl-p-aminophenol in an organic compound protective reaction medium by employing in the medium an aldehyde or ketone in small amounts as an impeller or catalyst, instead of as the protective medium itself, as has been done in the past. I have found that aldehydes and ketones act as catalysts and that the rate of decomposition of p-hydroxyphenylglycine to N-monomethyl-p-aminophenol is not proportional to the concentration of aldehyde or ketone in the reaction mixture, very small amounts of aldehyde or ketone sufficing to produce a rapid decomposition of p-hydroxyphenylglycine.

Thus, I have been able to decompose p-hydroxyphenylglycine to N-monomethyl-p-aminophenol in any suitable organic compound protective reaction medium, at a substantially rapid rate, employing only small amounts of aldehyde or ketone as a catalyst, thereby avoiding to a considerable extent side-reaction products caused by interaction of the N-monomethyl-p-aminophenol with the aldehydes and ketones such as takes place to a greater or lesser degree (particularly with aldehydes) when protective reaction media containing essentially aldehydes or ketones are employed.

It is, accordingly, an object of my invention to provide an improved process for preparing N-monomethyl-p-aminophenol. Other objects will become apparent hereinafter.

According to my invention, I decompose p-hydroxyphenylglycine to N-monomethyl-p-aminophenol in an organic compound protective reaction medium other than an aldehyde or ketone, in the presence of an aldehyde or ketone catalyst or impeller. The organic compound protective reaction medium can be any organic compound having a boiling point of at least about 140° C., other than an aldehyde or ketone, although acids such as might form a stable salt with p-hydroxyphenylglycine (e. g. butyric acid) should be avoided. Hydrocarbons, ethers, alcohols, esters, and phenols are typical useful protective reaction media. Even amines can be employed, but in this case the isolation of N-monomethyl-p-aminophenol from the final reaction mixture is rather difficult. The quantity of protective reaction medium in relation to the quantity of p-hydroxyphenylglycine can vary widely. Advantageously, however, the quantity of protective reaction medium is equal to from about 3 to about 10 times the weight of the p-hydroxyphenylglycine employed. A quantity equal to about 5 times the weight of the protective medium works well in most cases. The protective reaction medium is advantageously one that dissolves the N-monomethyl-p-aminophenol as it forms. Of course, protective reaction media which decompose appreciably at their boiling points should be avoided for best results.

The aldehyde or ketone impeller (or catalyst) can be any aldehyde or ketone having a boiling point of at least about 140° or 145° C. Only catalytic amounts of the aldehyde or ketone are necessary, i. e. the amount of aldehyde or ketone necessary is equal to not more than about 10 per cent by weight of the protective reaction medium. In most cases five, three or even one per cent or less of impeller works well.

Heat accelerates the decomposition of p-hydroxyphenylglycine according to my new process. In most cases, a temperature from about 135° C. to about 175° C. works well. In practice, I have found that a temperature of from about 140° C. to about 160° C. is advantageously employed. Employing aldehyde or ketone impellers in accordance with my invention, it is seldom essential to employ a temperature much in excess of 150° C. to obtain complete decarboxylation of the p-hydroxyphenylglycine in less than 30 minutes. Thus, the higher temperatures that are required in the prior processes (together with the resultant side-reactions) are, in large measure, avoided in my new process.

Following completion of the decomposition reaction, the reaction mass is advantageously stirred for a suitable period of time (e. g. 20 minutes) with a mineral acid (preferably sulfuric acid) to form a salt of the N-monomethyl-p-aminophenol. The reaction mass is advantageously diluted with from 5 to 20 times its weight of water or a lower aliphatic alcohol, such as methyl, ethyl or isopropyl, before the acid treatment. If alcohols are employed for dilution, the N-monomethyl-p-aminophenol salt (e. g. the sulfate) ordinarily separates out from solution following the acid treatment. This salt can then be filtered off and the monomethyl-para-aminophenol obtained therefrom by treatment with sodium carbonate solution in known manner. Instead of diluting the reaction mixture prior to treating with acid, the reaction mixture can be treated directly with a diluted acid, e. g. a 50% by weight ethyl alcoholic solution of sulfuric acid.

The following examples will serve to illustrate the manner of practicing my invention. However, these examples are not intended to limit my invention.

*Example 1.*—20 g. of p-hydroxyphenylglycine were mixed with 100 g. of n-primary amyl alcohol. The mixture was then heated at the boiling point (about 140° C.) for a period of time. Decarboxylation (evolution of carbon dioxide) was scarcely noticeable.

20 g. of p-hydroxyphenylglycine were mixed with 100 g. of n-primary amyl alcohol and about 5 cc. (about 5 g.) of benzaldehyde were added to the mixture. The mixture was then heated at the boiling point (about 140° C.). Decomposition, i. e. decarboxylation of the p-hydroxyphenylglycine was rapid, being complete in 15 to 20 minutes. The resulting cooled reaction mixture was treated with a 50% by weight ethyl alcoholic solution of sulfuric acid until the reaction mixture was just acid, as evidenced by a moist Congo red indicator. N-monomethyl-p-aminophenol in the form of its sulfate, separated from the reaction mixture as fine, practically white crystals which were filtered off, washed with alcohol and dried. 17 g. of crystals were obtained.

*Example 2.*—20 g. of p-hydroxyphenylglycine were mixed with 100 g. of diamyl ether. The resulting mixture was heated at 170° to 180° C. Decarboxylation was very slow. 5 cc. (about 5 g.) of benzaldehyde were added to the hot mixture. Decarboxylation became rapid and was complete in 15 to 20 minutes. The cooled reaction mixture was treated as in Example 1 to obtain N-monomethyl-p-aminophenol sulfate.

*Example 3.*—20 g. of p-hydroxyphenylglycine were mixed with 100 g. of cymene. The resulting mixture was heated at 175° to 185° C. Decarboxylation (evolution of carbon dioxide) was scarcely perceptible. 5 cc. (about 5 g.) of cyclohexanone were added to the hot mixture. Decarboxylation began at once at a moderately rapid rate. The rate of decarboxylation increased as monomethyl-p-aminophenol formed, indicating that the decarboxylation is autocatalytic. The decarboxylation was complete in one and one-half to two hours. The cooled reaction mixture was diluted with ethyl alcohol and then treated as in Example 1 to obtain N-monomethyl-p-aminophenol sulfate.

*Example 4.*—20 g. of p-hydroxyphenylglycine were mixed with 100 g. of phenol. The resulting mixture was heated at 160° C. Decarboxylation occurred slowly, requiring 2 to 3 hours for completion.

20 g. of p-hydroxyphenylglycine were mixed with 100 g. of phenol. 5 cc. (about 5 g.) of benzaldehyde were added to the mixture. The resulting mixture was heated at 160° C. Decarboxylation was rapid, being complete in 10 to 15 minutes. The cooled reaction mixture was treated as in Example 1 to obtain N-monomethyl-p-aminophenol sulfate.

*Example 5.*—20 g. of p-hydroxyphenylglycine were mixed with 100 g. of cresylic acid. The mixture was heated to 170° to 180° C. Decarboxylation proceeded slowly, being complete in 2 to 3 hours.

20 g. of p-hydroxyphenylglycine were mixed with 100 g. of cresylic acid. 5 cc. (about 5 g.) of benzaldehyde were added to the mixture. The resulting mixture was heated at 145° to 155° C. Decarboxylation was rapid, being complete in about 30 minutes. The cooled reaction mixture was treated as in Example 1 to obtain N-monomethyl-p-aminophenol sulfate.

*Example 6.*—20 g. of p-hydroxyphenylglycine were mixed with 100 cc. of cyclohexanol. The mixture was heated at 160° C. Decarboxylation was slow, being complete in 4 to 5 hours.

20 g. of p-hydroxyphenylglycine were mixed with 100 cc. of cyclohexanol. 5 cc. (about 5 g.) of benzaldehyde were added to the mixture. The resulting mixture was heated at 150° to 155° C. Decarboxylation was rapid, being complete in about 15 minutes. The cooled reaction mixture was treated as in Example 1 to obtain N-monomethyl-p-aminophenol.

Still further examples illustrating my invention could be provided, but the foregoing are believed to demonstrate the manner of practicing my invention. Instead of the aldehydes and ketones used in the above examples, acetophenone, benzophenone, methyl-n-hexyl ketone, chlorobenzaldehydes or n-valeraldehyde for example, can be employed.

What I claim as my invention and desire to be secured by Letters Patent of the United States is:

1. A process for preparing N-monomethyl-p-aminophenol comprising decomposing p-hydroxyphenylglycine to N-monomethyl-p-aminophenol in a protective reaction medium containing essentially an organic compound other than aldehydes and ketones and having a boiling point above 140° C., said reaction medium containing, in an amount equal to not more than about 10% by weight of the reaction medium, of an organic compound selected from the group consisting of aldehydes and ketones having a boiling point above 140° C.

2. A process for preparing N-monomethyl-p-aminophenol comprising decomposing p-hydroxyphenylglycine to N-monomethyl-p-aminophenol in a reaction medium consisting essentially of an organic compound having a boiling point above 140° C. and selected from the group consisting of hydrocarbons, alcohols, ethers, esters and phenols, said reaction medium containing, in an amount equal to not more than about 10 percent by weight of the reaction medium, an organic compound selected from the group consisting of aldehydes and ketones having a boiling point above 140° C.

3. A process for preparing N-monomethyl-p-aminophenol comprising decomposing p-hydroxyphenylglycine to N-monomethyl-p-aminophenol in a reaction medium consisting essentially of an phenol having a boiling point above 140° C., said reaction medium containing, in an amount equal to not more than about 10 per cent by weight of the reaction medium, an organic compound selected from the group consisting of aldehydes and ketones having a boiling point above 140° C.

4. A process for preparing N-monomethyl-p-aminophenol comprising decomposing p-hydroxyphenylglycine to N-monomethyl-p-aminophenol in a reaction medium consisting essentially of a phenol having a boiling point above 140° C., said reaction medium containing, in an amount equal to not more than than about 10 per cent by weight of the reaction medium, a ketone having a boiling point above 140° C.

5. A process for preparing N-monomethyl-p-aminophenol comprising decomposing p-hydroxyphenylglycine to N-monomethyl-p-aminophenol in a reaction medium consisting essentially of a phenol having a boiling point above 140° C., said reaction medium containing, in an amount equal to not more than about 10 per cent by weight of the reaction medium, an aldehyde having a boiling point above 140° C.

6. A process for preparing N-monomethyl-p-aminophenol comprising decomposing p-hydroxyphenylglycine to N-monomethyl-p-aminophenol in a reaction medium containing essentially cresylic acid, said reaction medium containing, in an amount equal to not more than about 10 per cent by weight of the reaction medium, benzaldehyde.

7. A process for preparing N-monomethyl-p-aminophenol comprising decomposing p-hydroxyphenylglycine to N-monomethyl-p-aminophenol in a reaction medium containing essentially phenol, said reaction medium containing, in an amount equal to not more than about 10 per cent by weight of the reaction medium, benzaldehyde.

FREDERIC R. BEAN.